US012512590B2

(12) United States Patent
Lee

(10) Patent No.: US 12,512,590 B2
(45) Date of Patent: Dec. 30, 2025

(54) WIDEBAND ANTENNA STRUCTURE

(71) Applicant: ASUSTeK COMPUTER INC., Taipei (TW)

(72) Inventor: Cheng-Tse Lee, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 280 days.

(21) Appl. No.: 18/311,987

(22) Filed: May 4, 2023

(65) Prior Publication Data

US 2024/0106117 A1 Mar. 28, 2024

(30) Foreign Application Priority Data

Sep. 28, 2022 (TW) .................................. 111136846

(51) Int. Cl.
*H01Q 5/307* (2015.01)
*H01Q 1/48* (2006.01)
*H01Q 9/04* (2006.01)

(52) U.S. Cl.
CPC ............... *H01Q 5/307* (2015.01); *H01Q 1/48* (2013.01); *H01Q 9/0421* (2013.01)

(58) Field of Classification Search
CPC ........ H01Q 5/307; H01Q 1/48; H01Q 9/0421; H01Q 13/106; H01Q 1/38; H01Q 9/0407; H01Q 9/065; H01Q 13/206; H01Q 15/142; H01Q 1/22; H01Q 1/24; H01Q 9/0414
See application file for complete search history.

(56) References Cited

U.S. PATENT DOCUMENTS

| | | | | |
|---|---|---|---|---|
| 2007/0285321 A1* | 12/2007 | Chung | H01Q 5/371 | 343/702 |
| 2011/0221638 A1* | 9/2011 | Lin | H01Q 1/243 | 343/700 MS |
| 2012/0162023 A1* | 6/2012 | Tai | H01Q 5/378 | 343/700 MS |
| 2014/0009342 A1* | 1/2014 | Wei | H01Q 21/28 | 343/700 MS |

(Continued)

FOREIGN PATENT DOCUMENTS

| | | |
|---|---|---|
| CN | 103545604 B | 7/2015 |
| CN | 106299679 B | 6/2019 |

(Continued)

*Primary Examiner* — Dameon E Levi
*Assistant Examiner* — David Andrew Kubera
(74) *Attorney, Agent, or Firm* — McClure, Qualey & Rodack, LLP

(57) ABSTRACT

A wideband antenna structure includes: a first radiating portion on a dielectric substrate is close to a first short side and including a first bending section; a second radiating portion on the dielectric substrate is close to a second short side and including a second bending section; a grounding portion on the dielectric substrate is including a first side edge close to the first short side and a second side edge on the other end, where the first side edge is connected to the first radiating portion; a coupling portion is on the dielectric substrate and between the first radiating portion and the grounding portion; a third radiating portion, one side of which is with a first flange connected to the second side edge and a second flange connected to the second radiating portion; and a signal source, connected to the coupling portion and the grounding portion.

10 Claims, 14 Drawing Sheets

(56) References Cited

U.S. PATENT DOCUMENTS

2020/0168993 A1* 5/2020 Wei .......................... H01Q 1/24

FOREIGN PATENT DOCUMENTS

| | | | | |
|---|---|---|---|---|
| CN | 107645040 | B | | 11/2020 |
| TW | M644167 | U | * | 7/2023 |
| TW | M649790 | U | * | 12/2023 |
| WO | WO-2022046028 | A1 | * | 3/2022 |

* cited by examiner

WIDEBAND ANTENNA STRUCTURE

CROSS-REFERENCE TO RELATED APPLICATION

This application claims the priority benefit of Taiwan Application Serial No. 111136846, filed on Sep. 28, 2022. The entirety of the above-mentioned patent application is hereby incorporated by reference herein and made a part of the specification.

BACKGROUND OF THE INVENTION

Field of the Invention

The disclosure relates to a wideband antenna structure that effectively reduces a size of an antenna to meet a design requirement of a narrow frame.

Description of the Related Art

For antenna design conventionally used in notebook computers, the area size of a planar antenna is usually 8 mm*40 mm (320 $mm^2$) or 10 mm*30 mm (300 $mm^2$). However, most notebook computers nowadays are designed with a high screen-to-body ratio. The non-screen width around a screen is only about 4 mm to 6 mm, making space available for the antenna greatly reduced. As a result, the antenna design manner and size of the conventional notebook computers fail to meet needs nowadays.

Therefore, how to design an antenna that meets requirements of narrow frame, miniaturization, and wide band at the same time is the focus of current antenna design.

BRIEF SUMMARY OF THE INVENTION

According to an aspect of this disclosure, a wideband antenna structure is provided. The wideband antenna structure includes a dielectric substrate, a first radiating portion, a second radiating portion, a grounding portion, a coupling portion, a third radiating portion, and a signal source. The dielectric substrate includes a first long side and a second long side that are opposite and a first short side and a second short side that are opposite. The first radiating portion is located on the dielectric substrate and close to the first short side, and includes a first bending section bent at least once and arranged along the first long side. The second radiating portion is located on the dielectric substrate and close to the second short side, and includes a second bending section bent at least once and arranged along the first long side, where the first bending section and the second bending section form an opening. The grounding portion is located on the dielectric substrate and arranged along the second long side, and includes a first side edge close to the first short side and a second side edge on the other end, where the first side edge is connected to the first radiating portion. The coupling portion is located on the dielectric substrate and between the first radiating portion and the grounding portion. One side of the third radiating portion is provided with a first flange and a second flange, where the first flange is connected to the second side edge, the second flange is connected to the second radiating portion, and the second radiating portion, the grounding portion, and the third radiating portion form a U-shaped notch. The signal source is located on the dielectric substrate and connected to the coupling portion and the grounding portion to transmit and receive a radio frequency signal.

In conclusion, the disclosure provides a wideband antenna structure, which uses a design of three radiating portions and one coupling portion to increase a resonant mode of an antenna, so as to achieve an objective of antenna miniaturization on the premise of increasing an operable bandwidth of the antenna. Therefore, the disclosure provides an antenna structure design that meets requirements of narrow frame, miniaturization, and wideband antenna at the same time. The antenna structure design effectively supports frequency bands of 2.4/5/6 GHz (2400 to 2500/5150 to 7125 MHz) and easily meets wideband requirements of latest Wi-Fi 6E, which is quite practical and competitive for mobile communication devices nowadays.

DETAILED DESCRIPTION OF THE EMBODIMENTS

Figure 1:
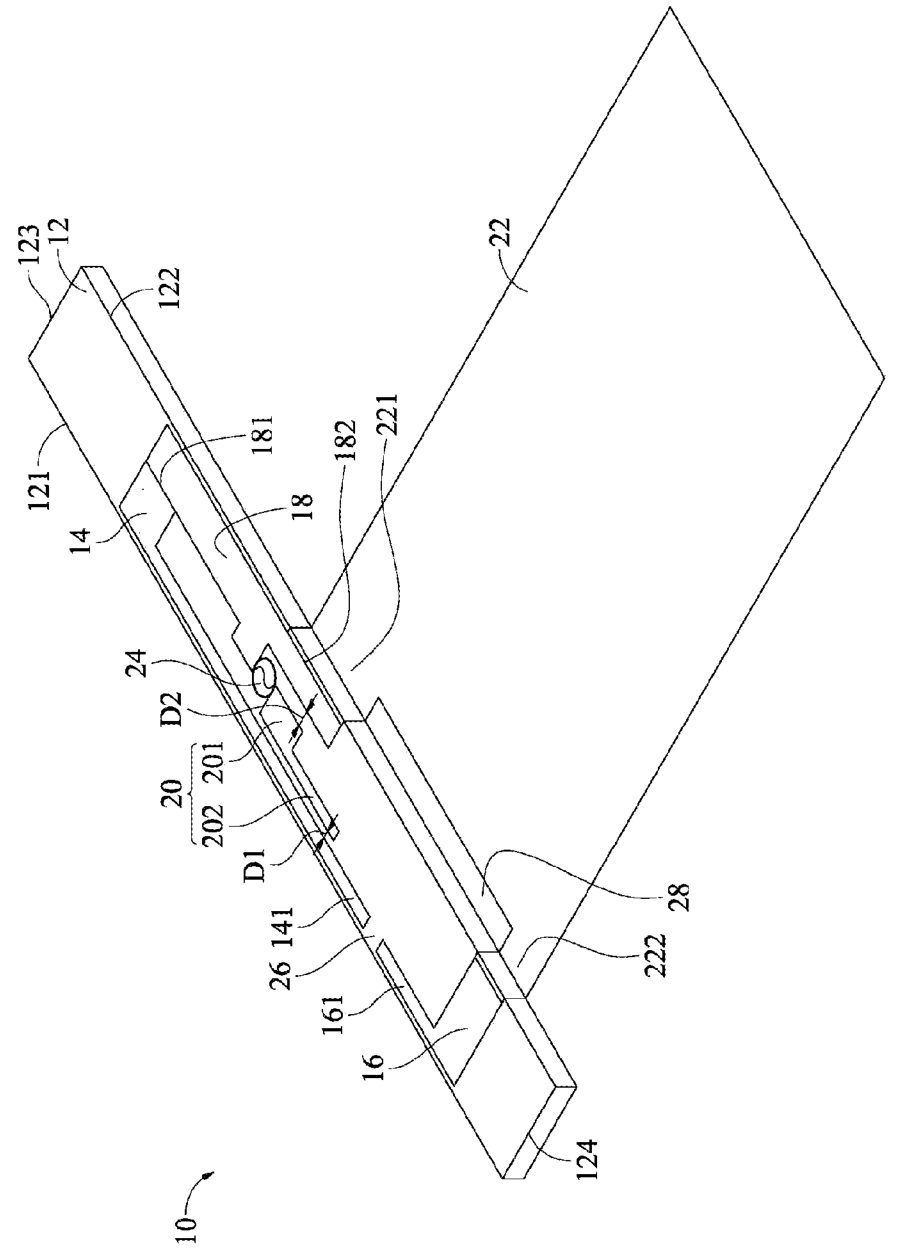
FIG. 1 is a three-dimensional schematic diagram of a wideband antenna structure according to an embodiment of the disclosure.

Embodiments of the disclosure are described below with reference to relevant drawings. In addition, part of elements or structures are omitted in the drawings in the embodiments to clearly show technical features of the disclosure. In these drawings, the same reference numerals represent the same or similar elements or circuits. It is to be understood that although the terms "first", "second", and the like in this specification are used to describe various elements, components, regions or functions, these elements, components, regions and/or functions are not limited by these terms. These terms are only used to distinguish one element, component, region or function from another element, component, region or function.

Figure 2:
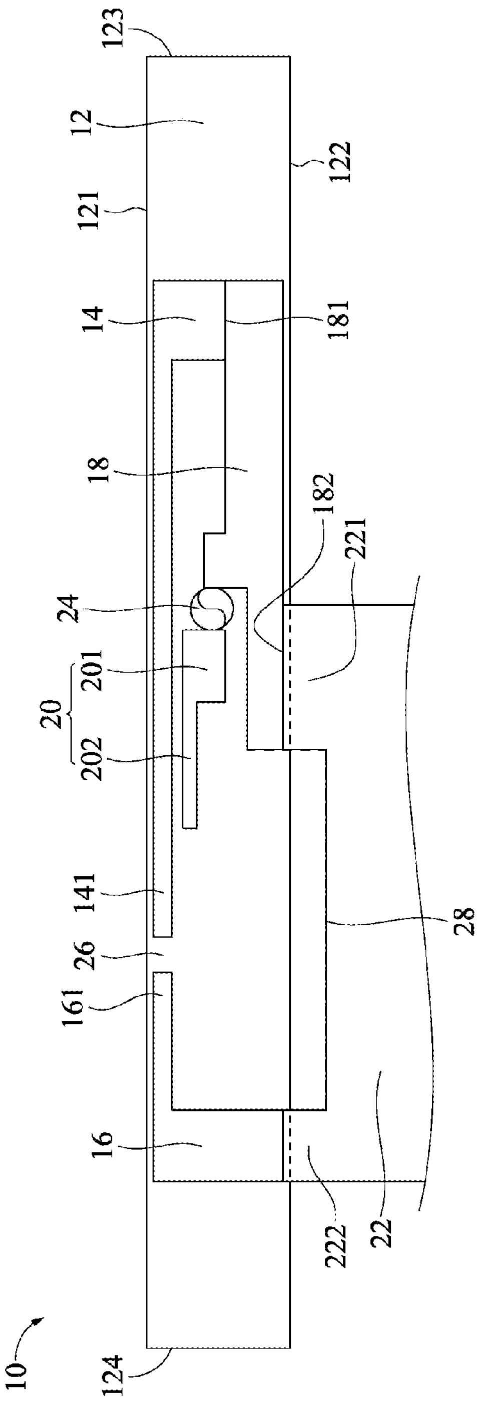
FIG. 2 is a schematic structural diagram of a wideband antenna structure according to an embodiment of the disclosure.

Referring to FIG. 1 and FIG. 2, a wideband antenna structure 10 includes a dielectric substrate 12, a first radiating portion 14, a second radiating portion 16, a grounding portion 18, a coupling portion 20, a third radiating portion 22, and a signal source 24.

As shown in FIG. 1 and FIG. 2, in the wideband antenna structure 10, the dielectric substrate 12 includes a first long side 121 and a second long side 122 that are opposite and a first short side 123 and a second short side 124 that are opposite. And, the first short side 123 is connected to a same side of the first long side 121 and the second long side 122, and the second short side 124 is connected to the other same side of the first long side 121 and the second long side 122. The first radiating portion 14 is located on the dielectric substrate 12 and close to the first short side 123, and includes a first bending section 141 bent at least once (bending toward the second short side 124) and arranged along the first long side 121. The second radiating portion 16 is located on the dielectric substrate 12 and close to the second short side 124, and includes a second bending section 161 bent at least once (bending toward the first short side 123) and arranged along the first long side 121. The first bending section 141 and the second bending section 161 form an opening 26. The grounding portion 18 is located on the dielectric substrate 12, close to the first short side 123, and arranged along the second long side 122. The grounding portion 18 includes a first side edge 181 close to the first short side 123 and a second side edge 182 on the other end, and the grounding portion 18 is connected to the first radiating portion 14 through the first side edge 181. The coupling portion 20 is located on the dielectric substrate 12 and between the first radiating portion 14 and the grounding portion 18. A first spacing D1 exists between the coupling portion 20 and the first radiating portion 14, and a second spacing D2 exists between the coupling portion 20 and the grounding portion 18, so as to adjust coupling energy of a radio frequency signal coupled to the wideband antenna structure 10 by adjusting the first spacing D1 and the second spacing D2. In this embodiment, the coupling portion 20 further includes a body 201 and an elongated section 202 with one end extending toward the second short side 124. The first spacing D1 exists between the elongated section 202 and the first bending section 141 of the first radiating portion 14, and the second spacing D2 exists between the body 201 and the grounding portion 18. One side of the third radiating portion 22 is provided with a first flange 221 and a second flange 222. The first flange 221 is connected to the second side edge 182 of the grounding portion 18, and the second flange 222 is connected to the second radiating portion 16. The second radiating portion 16, the grounding portion 18, and the third radiating portion 22 jointly form a U-shaped notch 28. The signal source 24 is located on the dielectric substrate 12. One end of the signal source 24 is connected to the coupling portion 20, and the other end is connected to the grounding portion 18, so as to transmit and receive a radio frequency signal by using a signal transmission medium such as a coaxial transmission line or a microstrip transmission line.

Figure 3:
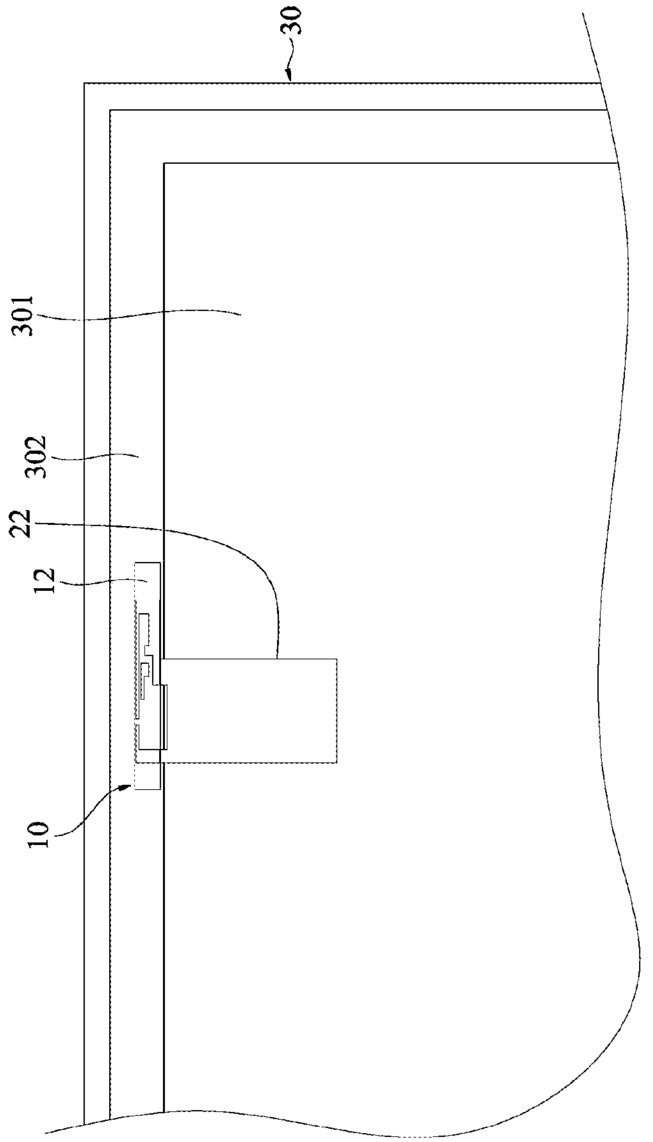
FIG. 3 is a schematic structural diagram of a wideband antenna structure installed on an electronic device according to an embodiment of the disclosure.

In this embodiment, a part of the third radiating portion 22 of the wideband antenna structure 10 is located on the dielectric substrate 12, and a remaining part of the third radiating portion 22 extends to the outside of the dielectric substrate 12. That is, a part in which the first flange 221 is connected to the grounding portion 18 and a part in which the second flange 222 is connected to the second radiating portion 16 are located on the dielectric substrate 12, and a remaining part extends outward to the outside of the dielectric substrate 12. Referring to FIG. 1, FIG. 2, and FIG. 3, the remaining part of the third radiating portion 22 extending to the outside of the dielectric substrate 12 is located on a plane in an electronic device 30. The plane is a metal plane 301, and the remaining part of the third radiating portion 22 is connected to the metal plane 301. In an embodiment, an extension length of the third radiating portion 22 is a length of 0.25 times the wavelength of a minimum operating frequency.

In an embodiment, the foregoing electronic device 30 is a mobile phone, a personal digital assistant, a tablet computer, a notebook computer, and the like, but the disclosure is not limited thereto. Any portable electronic device with a mobile communication function falls within the disclosure. In an embodiment, the electronic device 30 is a notebook computer. The dielectric substrate 12 of the wideband antenna structure 10 and various elements on the dielectric substrate 12 are arranged on a housing frame 302 of the electronic device 30, and the third radiating portion 22 extending to the outside of the dielectric substrate 12 is located on the metal plane 301. The third radiating portion 22 is connected to the metal plane 301, to ensure stability of grounding of the wideband antenna structure 10 and the surrounding metal plane 301. The third radiating portion 22 is a general conductive material, such as copper foil, aluminum foil or conductive cloth, which extends to the metal plane 301 and has conductive characteristics.

Figure 4:
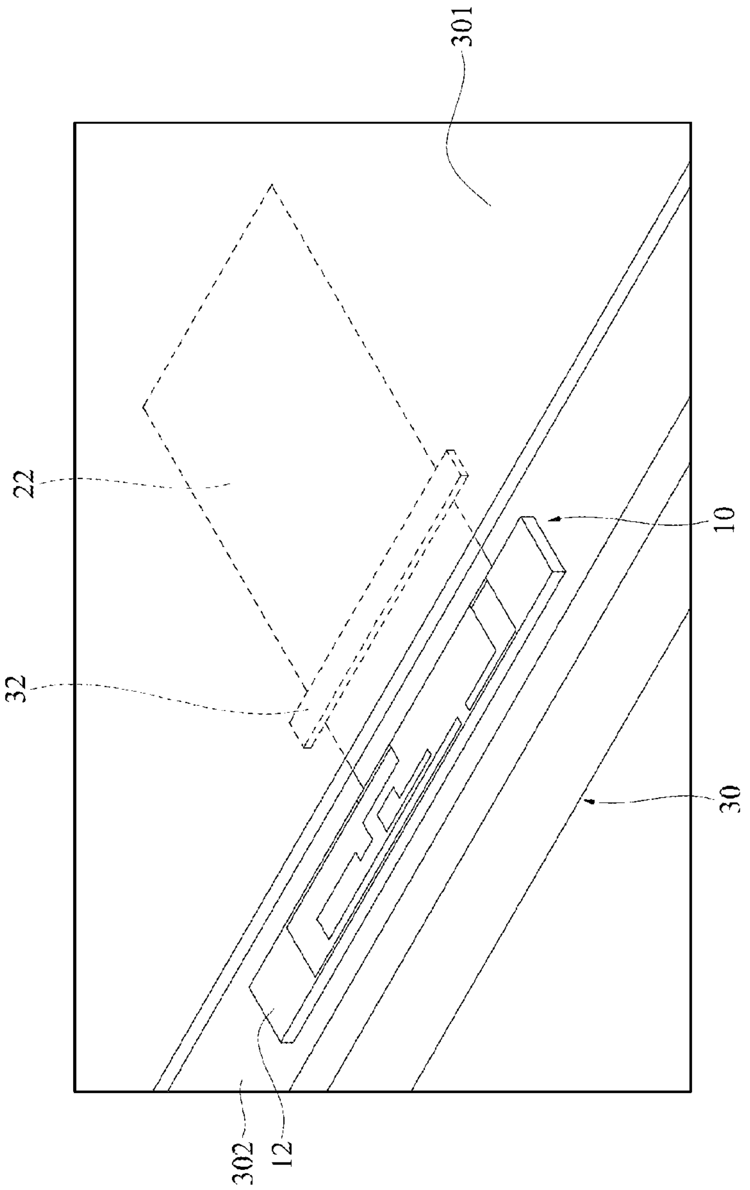
FIG. 4 is a schematic structural diagram of a wideband antenna structure installed on an electronic device according to another embodiment of the disclosure.
Figure 5:
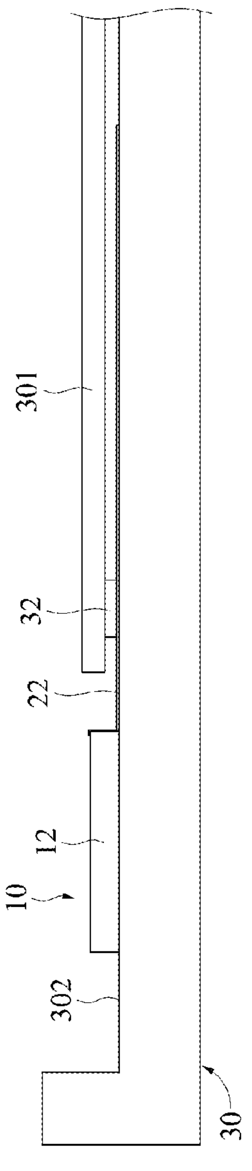
FIG. 5 is a structural side view of the wideband antenna structure shown in FIG. 4 installed on an electronic device according to the disclosure.

In addition, referring to FIG. 4 and FIG. 5, in the disclosure, furthermore, a conductor structure 32 is used to be arranged between the metal plane 301 of the electronic device 30 and the third radiating portion 22, and a gap exists between the metal plane 301 and the third radiating portion 22. In this embodiment, the conductor structure 32 is used to connect the third radiating portion 22 and the metal plane 301, so that the third radiating portion 22 is reliably electrically connected to the metal plane 301.

In another embodiment, alternatively, the third radiating portion 22 is located on the dielectric substrate 12. In this case, alternatively, the dielectric substrate 12 extends below the third radiating portion 22 to carry the third radiating portion 22 (not shown in the figure).

In an embodiment, as shown in FIG. 1 and FIG. 2, elements such as the first radiating portion 14 (including the first bending section 141), the second radiating portion 16 (including the second bending section 161), the grounding portion 18 and the coupling portion 20 (including the body 201 and the elongated section 202) are made of conductive metal materials, such as silver, copper, aluminum, iron or their alloys, but the disclosure is not limited thereto.

Figure 6:
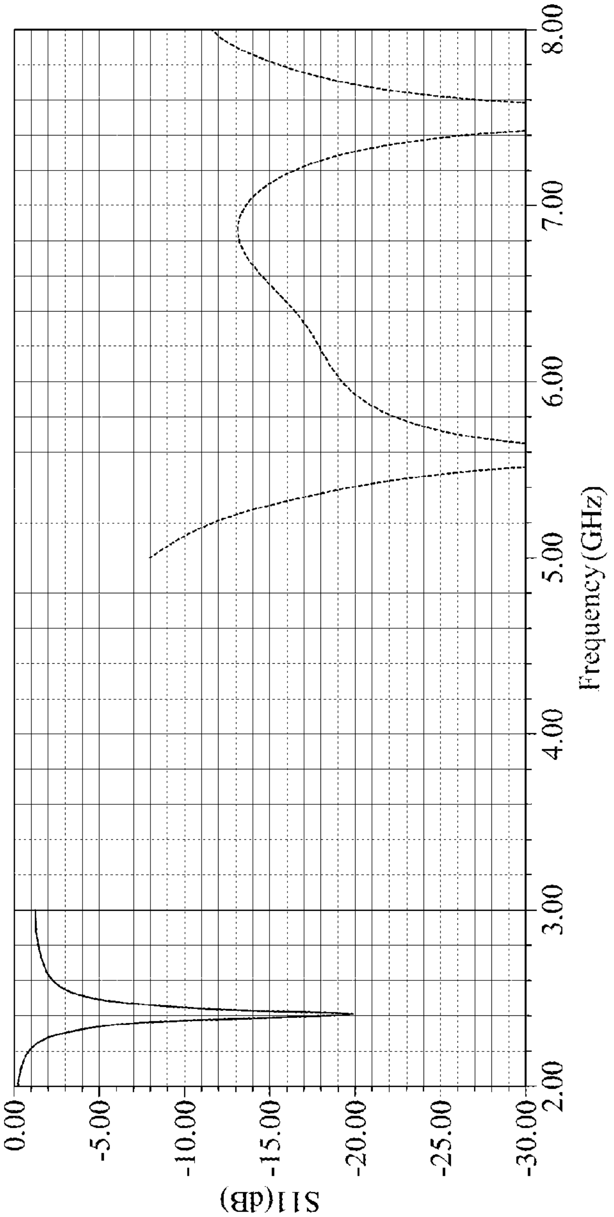
FIG. 6 is a schematic diagram of S-parameter simulation of a wideband antenna structure in various operating states according to an embodiment of the disclosure.

Referring to FIG. 1, FIG. 2 and FIG. 6, in the wideband antenna structure 10, the first radiating portion 14, the grounding portion 18, the coupling portion 20, and the third radiating portion 22 are responsible for exciting a first operating mode, a center frequency of which is about 2.4 GHz. In this way, a frequency and impedance matching of the first operating mode are adjusted by adjusting lengths and widths of the first radiating portion 14, the grounding portion 18, the coupling portion 20, and the third radiating portion 22. The second radiating portion 16, the third radiating portion 22 and the grounding portion 18 are responsible for exciting a second operating mode and a third operating mode, center frequencies of which are 5.5 GHz and 7.5 GHz respectively. In this way, frequencies and impedance matching of the second operating mode and the third operating mode are adjusted by adjusting a size of the U-shaped notch 28 formed by the second radiating portion 16, the third radiating portion 22, and the grounding portion 18. Therefore, in combination with the first operating mode, the second operating mode and the third operating mode, an operating bandwidth of the wideband antenna structure 10 in the disclosure meets three-frequency band operating ranges of Wi-Fi 6E (2.4/5/6 GHz, 2400 to 2500/5150 to 5850/5925 to 7125 MHz).

The wideband antenna structure 10 disclosed in the disclosure indeed has a good reflection coefficient. Referring to FIG. 1, FIG. 2 and FIG. 6, in the wideband antenna structure 10, the size of the wideband antenna structure 10 located on the dielectric substrate 12 is 3.6 mm*25 mm (90 $mm^2$), and the length of a part of the third radiating portion 22 extending to the outside of the dielectric substrate 12 is 30 mm, and the width is 16 mm. S-parameter (reflection coefficient) simulation analysis is performed with the wideband antenna structure 10 when the radio frequency signal is transmitted. S-parameter simulation results of the wideband antenna structure 10 in a low-frequency operating frequency band and a high-frequency operating frequency band are shown in FIG. 6. It is known from the curve shown in FIG. 6 that the reflection coefficients (S11) shown in the figure are less than −10 dB (S11<−10 dB) in the low-frequency operating frequency band and the high-frequency operating frequency band, which proves that the wideband antenna structure 10 has a good reflection coefficient in both the low-frequency operating frequency band (first operating mode) and the high-frequency operating frequency band (the second operating mode and the third operating mode), and meets three frequency bands of WiFi 6E of 2400 MHz to 2500 MHz, 5150 to 5850 MHz, and 5925 MHz to 7125 MHz.

Figure 7:
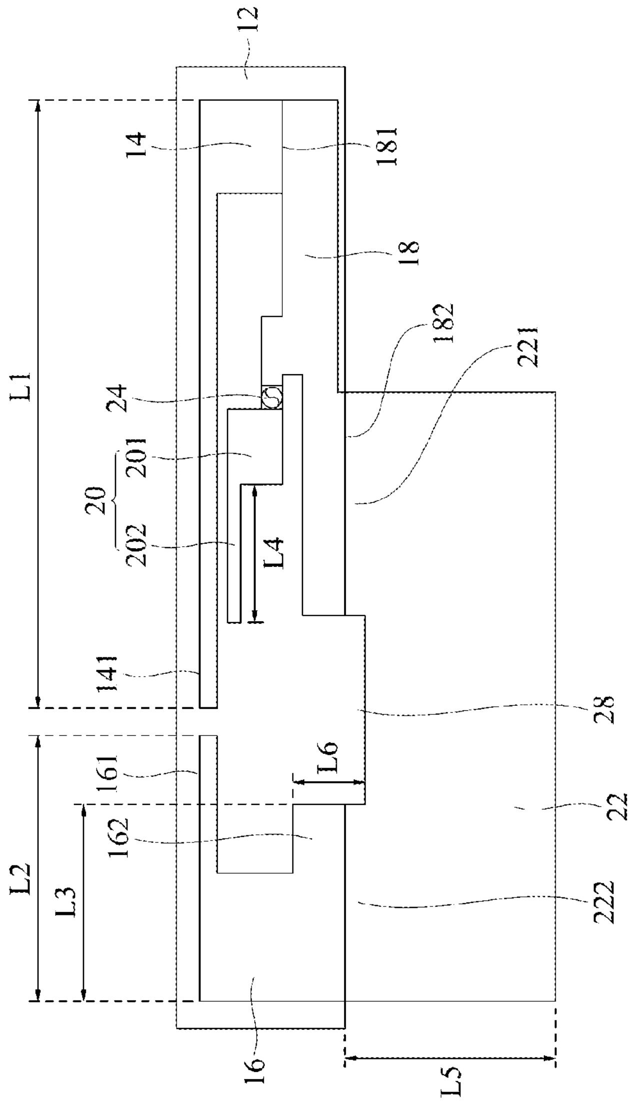
FIG. 7 is a schematic structural diagram of a wideband antenna structure according to still another embodiment of the disclosure.

In an embodiment, referring to FIG. 7, in the wideband antenna structure 10, an end portion of the second radiating portion 16 includes a second bending section 161 bent at least once (bending toward the first short side 123) and arranged along the first long side 121, and the other end portion of the second radiating portion 16 further includes a third bending section 162 bent once (bending toward the first short side 123) and arranged along the second long side 122. The third bending section 162 is connected to the second flange 222 of the third radiating portion 22. The third bending section 162, the grounding portion 18, and the third radiating portion 22 form the U-shaped notch 28. Except for the second radiating portion 16, other elements and structures are the same as those in the embodiments shown in FIG. 1 and FIG. 2. Therefore, reference is made to the foregoing descriptions, and details are not described herein again.

Figure 8:
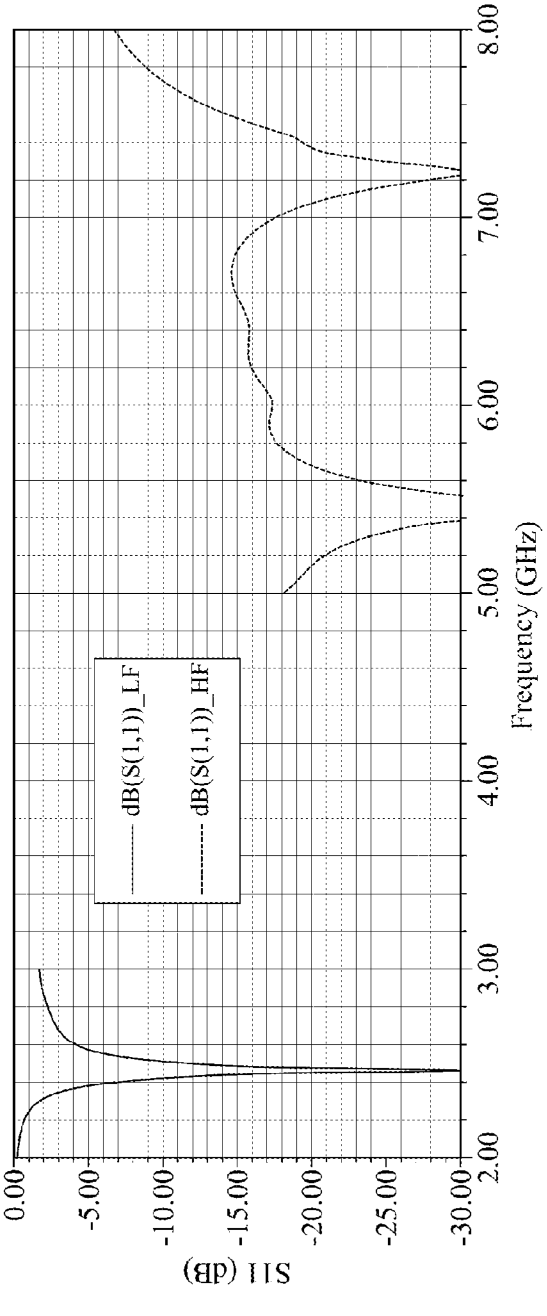
FIG. 8 is a schematic diagram of S-parameter simulation of the wideband antenna structure shown in FIG. 7 in various operating states according to the disclosure.

Next, in the disclosure, an actual size of the wideband antenna structure 10 in FIG. 7 is used as an example to discuss which operating mode of the wideband antenna structure 10 is affected by the change of the lengths or widths of the elements. Referring to FIG. 7, a first length L1 of the first bending section 141 included in the first radiating portion 14 is 17.7 mm, a second length L2 of the second bending section 161 included in the second radiating portion 16 is 7.7 mm, a third length L3 of the third bending section 162 included in the second radiating portion 16 is 5.7 mm, a fourth length L4 of the elongated section 202 of the coupling portion 20 is 4 mm, a fifth length L5 of the third radiating portion 22 is 30 mm, and a sixth length L6 formed by the third bending section 162 and the second flange 222 is 2 mm. The S-parameter (reflection coefficient) simulation analysis is performed with the structure and size of the wideband antenna structure 10 shown in FIG. 7 in the low-frequency operating frequency band and the high-frequency operating frequency band, respectively. The simulation results of the reflection coefficient (S11) are shown in FIG. 8. It is known from the curve shown in FIG. 8 that the wideband antenna structure 10 has good reflection coefficients in both the low-frequency operating frequency band (first operating mode) and the high-frequency operating frequency band (the second operating mode and the third operating mode). Based on the operating performance, how the operating mode of the wideband antenna structure 10 is affected by the length change of the elements from the first length L1 to the sixth length L6 is discussed.

Figure 9:
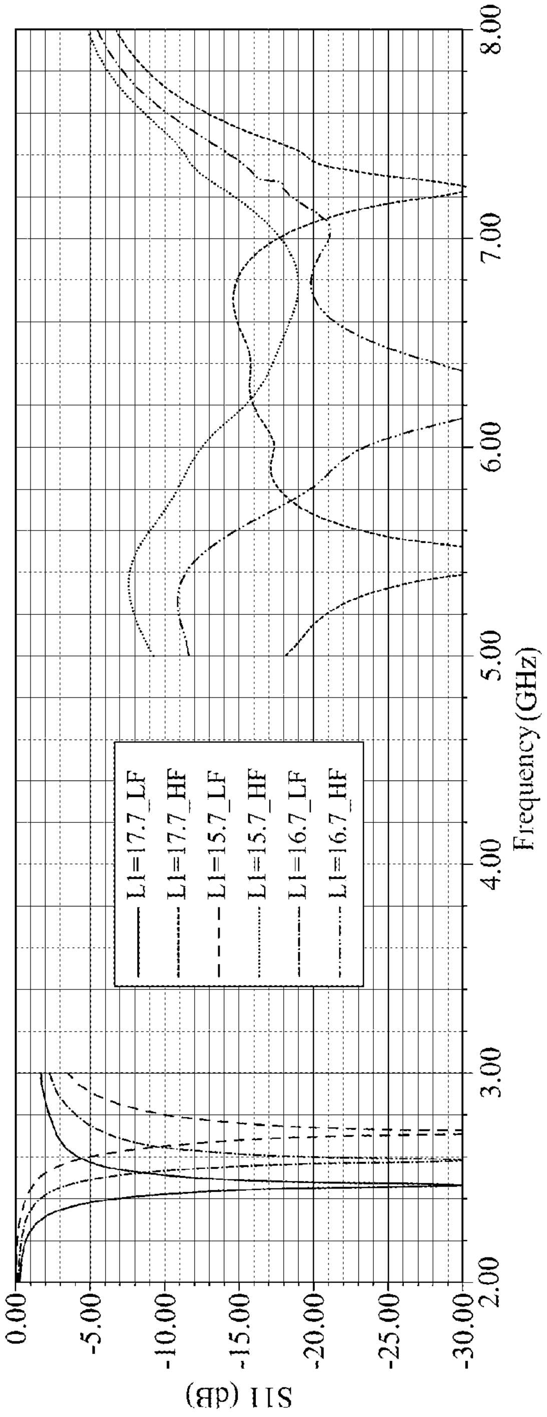
FIG. 9 is a schematic diagram of S-parameter simulation of a wideband antenna structure in various operating states with a first length (L1) changed according to an embodiment of the disclosure.

Referring to FIG. 7 and FIG. 9, the first length L1 shown in FIG. 7 is originally 17.7 mm, and the first length L1 is changed so that the first length L1 is 17.7 mm, 15.7 mm and 16.7 mm respectively. The S-parameter (reflection coefficient) simulation analysis is performed in the low-frequency operating frequency band and the high-frequency operating frequency band with the three lengths. The simulation results of the reflection coefficient (S11) are shown in FIG. 9. It is known from the curve shown in FIG. 9 that changing the length of the first length L1 changes a low-frequency operating mode (first operating mode) and also changes a high-frequency operating mode (the second operating mode and the third operating mode). Therefore, in the wideband antenna structure 10, in the disclosure, the frequencies of the first operating mode, the second operating mode and the third operating mode are adjusted by adjusting the first length L1 of the first bending section 141 included in the first radiating portion 14.

Figure 10:
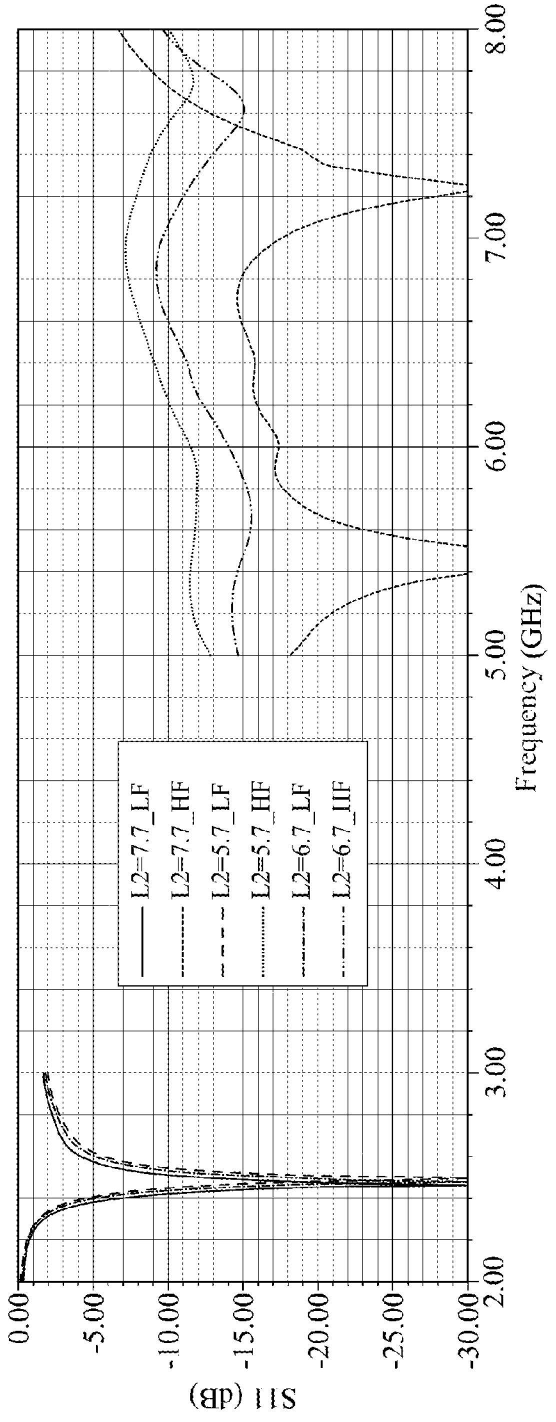
FIG. 10 is a schematic diagram of S-parameter simulation of a wideband antenna structure in various operating states with a second length (L2) changed according to an embodiment of the disclosure.

Referring to FIG. 7 and FIG. 10, the second length L2 shown in FIG. 7 is originally 7.7 mm, and the second length L2 is changed so that the second length L2 is 7.7 mm, 5.7 mm and 6.7 mm respectively. The S-parameter (reflection coefficient) simulation analysis is performed in the low-frequency operating frequency band and the high-frequency operating frequency band with the three lengths. The simulation results of the reflection coefficient (S11) are shown in FIG. 10. It is known from the curve shown in FIG. 10 that changing the length of the second length L2 changes the high-frequency operating mode (the second operating mode and the third operating mode). Therefore, in the wideband antenna structure 10, in the disclosure, the frequencies of the second operating mode and the third operating mode are adjusted by adjusting the second length L2 of the second bending section 161 included in the second radiating portion 16.

Figure 11:
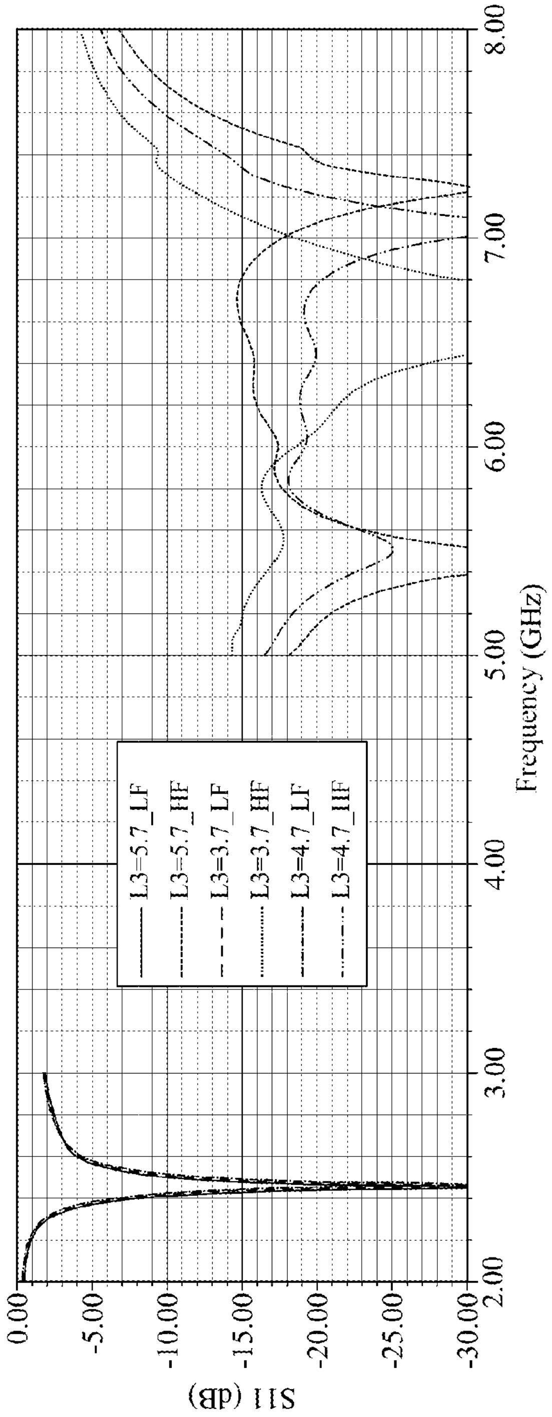
FIG. 11 is a schematic diagram of S-parameter simulation of a wideband antenna structure in various operating states with a third length (L3) changed according to an embodiment of the disclosure.

Referring to FIG. 7 and FIG. 11, the third length L3 shown in FIG. 7 is originally 5.7 mm, and the third length L3 is changed so that the third length L3 is 5.7 mm, 3.7 mm and 4.7 mm respectively. The S-parameter (reflection coefficient) simulation analysis is performed in the low-frequency operating frequency band and the high-frequency operating frequency band with the three lengths. The simulation results of the reflection coefficient (S11) are shown in FIG. 11. It is known from the curve shown in FIG. 11 that changing the length of the third length L3 changes the high-frequency operating mode (the second operating mode and the third operating mode). Therefore, in the wideband antenna structure 10, in the disclosure, the frequencies of the second operating mode and the third operating mode are adjusted by adjusting the third length L3 of the third bending section 162 included in the second radiating portion 16.

Figure 12:
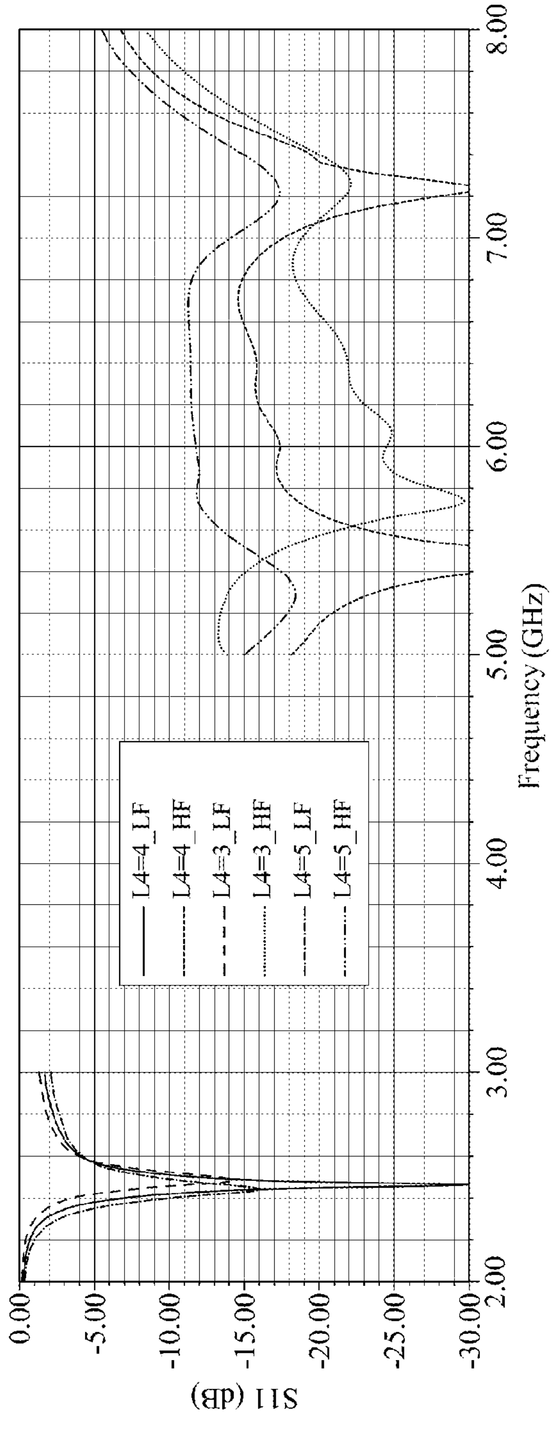
FIG. 12 is a schematic diagram of S-parameter simulation of a wideband antenna structure in various operating states with a fourth length (L4) changed according to an embodiment of the disclosure.

Referring to FIG. 7 and FIG. 12, the fourth length L4 shown in FIG. 7 is originally 4 mm, and the fourth length L4 is changed so that the fourth length L4 is 4 mm, 3 mm and 5 mm respectively. The S-parameter (reflection coefficient) simulation analysis is performed in the low-frequency operating frequency band and the high-frequency operating frequency band with the three lengths. The simulation results of the reflection coefficient (S11) are shown in FIG. 12. It is known from the curve shown in FIG. 12 that changing the length of the fourth length L4 changes the low-frequency operating mode (first operating mode) and also changes the high-frequency operating mode (the second operating mode and the third operating mode). Therefore, in the wideband antenna structure 10, in the disclosure, the frequencies of the first operating mode, the second operating mode and the third operating mode are adjusted by adjusting the fourth length L4 of the elongated section 202 of the coupling portion 20.

Figure 13:
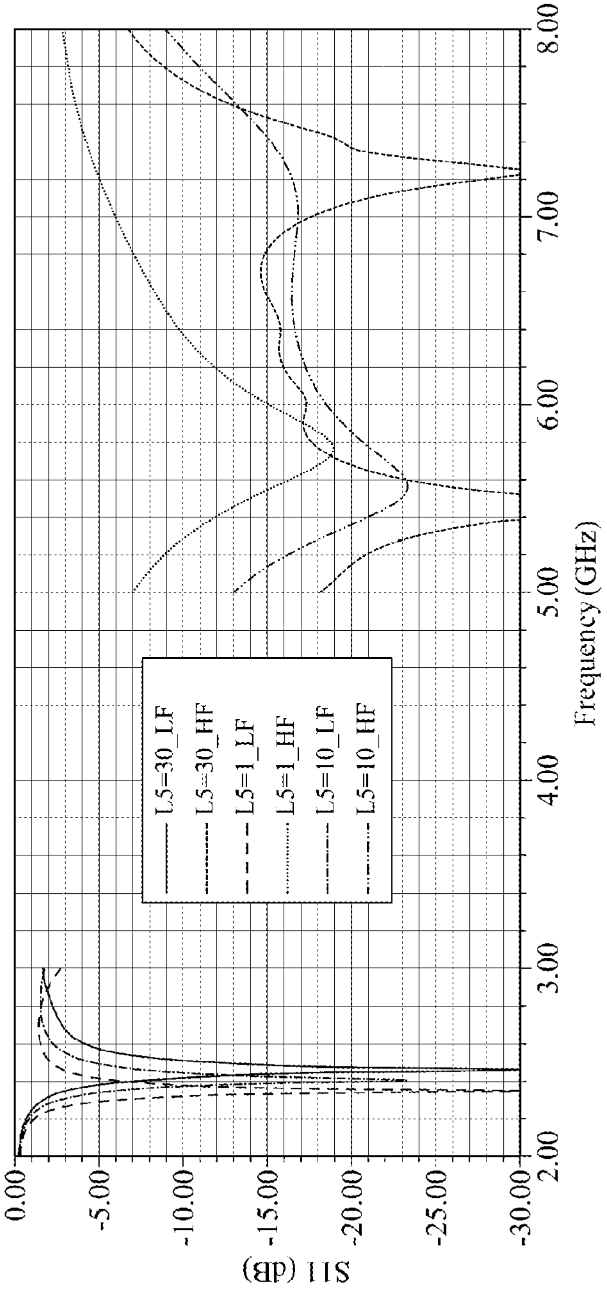
FIG. 13 is a schematic diagram of S-parameter simulation of a wideband antenna structure in various operating states with a fifth length (L5) changed according to an embodiment of the disclosure.

Referring to FIG. 7 and FIG. 13, the fifth length L5 shown in FIG. 7 is originally 30 mm, and the fifth length L5 is changed so that the fifth length L5 is 30 mm, 1 mm and 10 mm respectively. The S-parameter (reflection coefficient) simulation analysis is performed in the low-frequency operating frequency band and the high-frequency operating frequency band with the three lengths. The simulation results of the reflection coefficient (S11) are shown in FIG. 13. It is known from the curve shown in FIG. 13 that changing the length of the fifth length L5 changes the low-frequency operating mode (first operating mode) and also changes the high-frequency operating mode (the second operating mode and the third operating mode). Therefore, in the wideband antenna structure 10, in the disclosure, the frequencies of the first operating mode, the second operating mode and the third operating mode are adjusted by adjusting the fifth length L5 of the third radiating portion 22.

Figure 14:
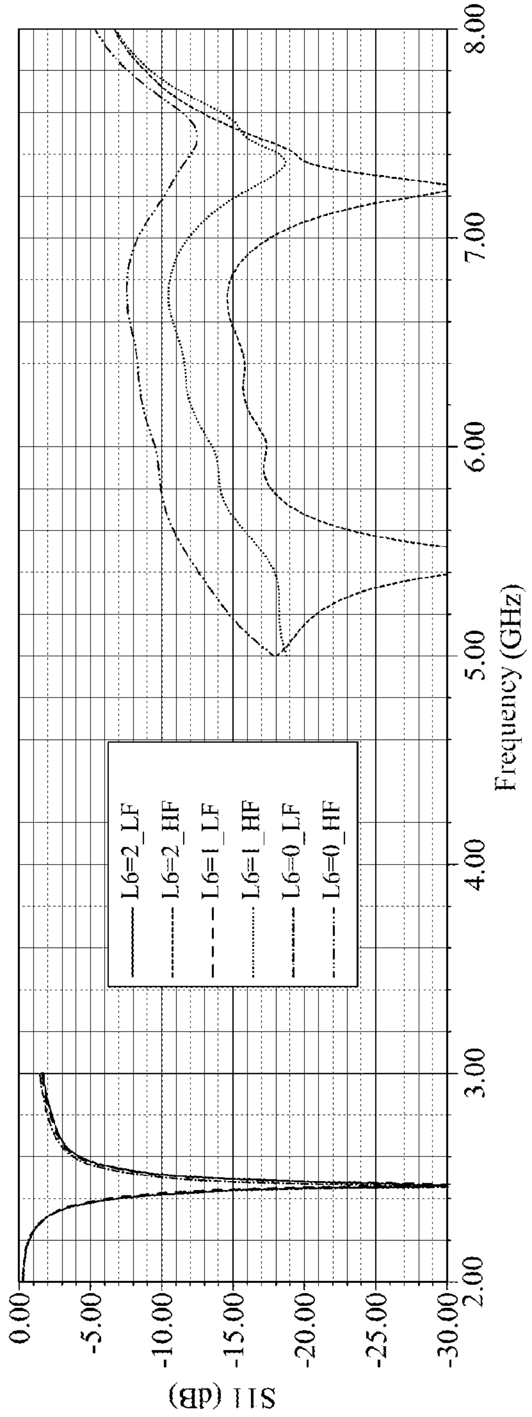
FIG. 14 is a schematic diagram of S-parameter simulation of a wideband antenna structure in various operating states with a sixth length (L6) changed according to an embodiment of the disclosure.

Referring to FIG. 7 and FIG. 14, the sixth length L6 shown in FIG. 7 is originally 2 mm, and the sixth length L6 is changed so that the sixth length L6 is 2 mm, 1 mm and 0 mm respectively. The S-parameter (reflection coefficient) simulation analysis is performed in the low-frequency operating frequency band and the high-frequency operating frequency band with the three lengths. The simulation results of the reflection coefficient (S11) are shown in FIG. 14. It is known from the curve shown in FIG. 14 that changing the length of the sixth length L6 changes the high-frequency operating mode (the second operating mode and the third operating mode). Therefore, in the wideband antenna structure 10, in the disclosure, the frequencies of the second operating mode and the third operating mode are adjusted by adjusting the sixth length L6 formed by the third bending section 162 of the second radiating portion 16 and the second flange 222 of the third radiating portion 22.

Therefore, in the disclosure, the frequency of the first operating mode is adjusted by adjusting the first length L1, the fourth length L4, and the fifth length L5, and the frequencies of the second operating mode and the third operating mode are adjusted by adjusting the first length L1, the second length L2, the third length L3, the fourth length L4, the fifth length L5 and the sixth length L6. In addition, in the disclosure, furthermore, a relative position and spacing between the coupling portion 20 and the first radiating portion 14 are adjusted to effectively reduce the minimum operating frequency (first operating mode) of the antenna and adjust the impedance matching, thereby achieving the objective of antenna miniaturization. Besides, the size of the U-shaped notch 28 formed by the first radiating portion 14, the grounding portion 18, the second radiating portion 16, and the third radiating portion 22 is adjusted to effectively adjust the frequencies and impedance matching of the second operating mode and the third operating mode, so as to achieve wideband characteristics.

In conclusion, the disclosure provides a wideband antenna structure, which uses a design of three radiating portions and one coupling portion to increase a resonant mode of an antenna, so as to achieve an objective of antenna miniaturization on the premise of increasing an operable bandwidth of the antenna. Therefore, the disclosure provides an antenna structure design that meets requirements of narrow frame, miniaturization, and wideband antenna at the same time. The antenna structure design effectively supports frequency bands of 2.4/5/6 GHz (2400 to 2500/5150 to 7125 MHz) and easily meets wideband requirements of latest Wi-Fi 6E, which is quite practical and competitive for mobile communication devices nowadays.

The embodiments described above are only used for describing the technical ideas and characteristics of the disclosure, and are intended to enable a person skilled in the art to understand and implement the content of the disclosure. However, the patent scope of the disclosure is not limited thereto. That is, any equivalent change or modification made according to the spirit disclosed in the disclosure shall still fall within the patent scope of the disclosure.

What is claimed is:

1. A wideband antenna structure, comprising:

a dielectric substrate, comprising a first long side and a second long side that are opposite and a first short side and a second short side that are opposite;

a first radiating portion, located on the dielectric substrate and close to the first short side, and comprising a first bending section bent at least once and arranged along the first long side;

a second radiating portion, located on the dielectric substrate and close to the second short side, and comprising a second bending section bent at least once and arranged along the first long side, wherein the first bending section and the second bending section form an opening;

a grounding portion, located on the dielectric substrate and arranged along the second long side, and comprising a first side edge close to the first short side and a second side edge on the other end, wherein the first side edge is connected to the first radiating portion;

a coupling portion, located on the dielectric substrate and between the first radiating portion and the grounding portion;

a third radiating portion, one side of which is provided with a first flange and a second flange, wherein the first flange is connected to the second side edge, the second flange is connected to the second radiating portion, and the second radiating portion, the grounding portion, and the third radiating portion form a U-shaped notch; and a signal source, located on the dielectric substrate and directly connected to the coupling portion and the grounding portion to transmit and receive a radio frequency signal.

2. The wideband antenna structure according to claim 1, wherein a part of the third radiating portion is located on the dielectric substrate, and a remaining part extends to the outside of the dielectric substrate.

3. The wideband antenna structure according to claim 2, wherein the remaining part of the third radiating portion extending to the outside of the dielectric substrate is located on a plane in an electronic device.

4. The wideband antenna structure according to claim 3, wherein the plane is a metal plane, and the remaining part is connected to the metal plane.

5. The wideband antenna structure according to claim 1, wherein an extension length of the third radiating portion is a length of 0.25 times a wavelength with a minimum operating frequency.

6. The wideband antenna structure according to claim 1, wherein the first radiating portion, the grounding portion, the coupling portion, and the third radiating portion excite a first operating mode, and a center frequency of which is about 2.4 GHz.

7. The wideband antenna structure according to claim 6, wherein the second radiating portion, the third radiating portion and the grounding portion excite a second operating mode and a third operating mode, and center frequencies of which are 5.5 GHz and 7.5 GHz respectively.

8. The wideband antenna structure according to claim 1, wherein a first spacing exists between the coupling portion and the first radiating portion, and a second spacing exists between the coupling portion and the grounding portion, to adjust coupling energy of the radio frequency signal by adjusting the first spacing and the second spacing.

9. The wideband antenna structure according to claim 8, wherein the coupling portion further comprises a body and an elongated section with one end extending toward the second short side, the first spacing exists between the elongated section and the first radiating portion, and the second spacing exists between the body and the grounding portion.

10. The wideband antenna structure according to claim 1, wherein the second radiating portion further comprises a third bending section bent once and along the second long side, the third bending section is connected to the second flange, and the third bending section, the grounding portion, and the third radiating portion form the U-shaped notch.

* * * * *